United States Patent
Yu

(10) Patent No.: US 11,520,413 B2
(45) Date of Patent: Dec. 6, 2022

(54) ELECTRONIC APPARATUS, CONTROLLING METHOD OF ELECTRONIC APPARATUS AND COMPUTER READABLE MEDIUM

(71) Applicant: SAMSUNG ELECTRONICS CO., LTD., Suwon-si (KR)

(72) Inventor: Seunghak Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 350 days.

(21) Appl. No.: 16/672,809

(22) Filed: Nov. 4, 2019

(65) Prior Publication Data

US 2020/0142504 A1 May 7, 2020

(30) Foreign Application Priority Data

Nov. 2, 2018 (KR) .................. 10-2018-0133897
Oct. 31, 2019 (KR) .................. 10-2019-0137841

(51) Int. Cl.
*G06F 3/023* (2006.01)
*G06N 3/04* (2006.01)
(Continued)

(52) U.S. Cl.
CPC .......... *G06F 3/0237* (2013.01); *G06F 3/0236* (2013.01); *G06F 3/04886* (2013.01);
(Continued)

(58) Field of Classification Search
CPC ........ G06F 3/0237; G06F 40/274; G06N 3/02
See application file for complete search history.

(56) References Cited

U.S. PATENT DOCUMENTS 9,306,878 B2 *   4/2016   Patil .................... G06Q 10/107
2005/0076090 A1  4/2005   Thuerk
(Continued)

FOREIGN PATENT DOCUMENTS

| KR | 10-2010-0062251 | 6/2010 |
| KR | 10-1555743 | 9/2015 |
| WO | 2011/088053 | 7/2011 |

OTHER PUBLICATIONS

Mirowski et al., "Dependency recurrent neural language models for sentence completion." arXiv preprint arXiv:1507.01193 (Year: 2015).*
(Continued)

*Primary Examiner* — Samuel G Neway
(74) *Attorney, Agent, or Firm* — Nixon & Vanderhye, P.C.

(57) ABSTRACT

Disclosed is an electronic apparatus. The electronic apparatus includes a communicator comprising communication circuitry; and a processor configured to control the electronic apparatus to: obtain a recommended message including the inputted text using a machine trained language model, based on a text being input, and control the communicator to transmit the recommended message to an external electronic apparatus based on receiving an input for transmitting the recommended message. The processor may be configured to control the electronic apparatus to obtain the recommended message by applying the inputted text and one or more message transmitted and received between the communicator and the external electronic apparatus prior to the text being input to the language model.

13 Claims, 7 Drawing Sheets

(51) Int. Cl.
*G06K 9/62* (2022.01)
*G06F 3/04886* (2022.01)
*G06F 40/274* (2020.01)
*G06N 3/02* (2006.01)

(52) U.S. Cl.
CPC ......... *G06F 40/274* (2020.01); *G06K 9/6256* (2013.01); *G06N 3/04* (2013.01); *G06N 3/02* (2013.01)

(56) References Cited

U.S. PATENT DOCUMENTS

| | | | | |
|---|---|---|---|---|
| 2014/0297267 | A1* | 10/2014 | Spencer | G06F 40/274 704/9 |
| 2014/0337438 | A1* | 11/2014 | Govande | H04L 51/063 709/206 |
| 2017/0017718 | A1 | 1/2017 | Nakayama et al. | |
| 2018/0005112 | A1* | 1/2018 | Iso-Sipila | G06N 3/08 |
| 2018/0052909 | A1* | 2/2018 | Sharifi | G06F 16/3326 |
| 2018/0101599 | A1* | 4/2018 | Arnold | G06F 40/274 |
| 2018/0173691 | A1* | 6/2018 | Hsu | G06F 40/166 |
| 2019/0025939 | A1* | 1/2019 | Patel | G06F 3/04817 |
| 2020/0142504 | A1* | 5/2020 | Yu | G06F 40/274 |
| 2020/0394362 | A1* | 12/2020 | Lee | G06F 3/0237 |

OTHER PUBLICATIONS

Pang et al., "Revisiting the predictability of language: Response completion in social media." Proceedings of the 2012 Joint Conference on Empirical Methods in Natural Language Processing and Computational Natural Language Learning. (Year: 2012).*

Y. Wu, "Smart Compose: Using Neural Networks to Help Write Emails", *Google AI Blog*, printed Aug. 14, 2018, 8 pages.

* cited by examiner

ELECTRONIC APPARATUS, CONTROLLING METHOD OF ELECTRONIC APPARATUS AND COMPUTER READABLE MEDIUM

CROSS-REFERENCE TO RELATED APPLICATION

This application is based on and claims priority under 35 U.S.C. § 119 to Korean Patent Application Number 10-2018-0133897 filed on Nov. 2, 2018 and Korean Patent Application Number 10-2019-0137841 filed on Oct. 31, 2019, in the Korean Intellectual Property Office, the disclosures of which are incorporated by reference herein in their entirety.

BACKGROUND

1. Field

The disclosure relates to an electronic apparatus that proactively recommends a sentence that user intends to input. For example, based on a content of a message transmitted and received with an external apparatus, the disclosure relates to an electronic apparatus that follows the relevant message and recommends a sentence that includes words inputted by the user.

2. Description of Related Art

In order to alleviate user effort on typing, technology for an electronic apparatus predicting and recommending the next word based on words typically inputted by the user has been present.

The existing electronic apparatus is, however, inconvenient in that, based on recommending a word at a time to follow the word input by the user, only one word is obtained per one select input even if the user selects the recommended word, thereby the number of times selecting is increased even if typing is reduced.

In addition, even if only the word input by the user is simply considered, often was the case where an appropriate recommended word was not suggested.

SUMMARY

Embodiments of the disclosure provide an electronic apparatus that recommends appropriate sentences considering the content of messages transmitted and received previously with an external apparatus and user input words.

An example aspect of the present disclosure is in providing an electronic apparatus that proactively recommends a completed sentence form intended to be input by a user by applying a word corresponding to a user inputted text and contextual information of a message transmitted and received prior to text input to a language module trained in, for example, a recurrent neural network (RNN) to recommend a sentence including the word corresponding to the inputted text.

An electronic apparatus according to an example embodiment of the present disclosure includes a communicator comprising communication circuitry and a processor configured to control the electronic apparatus to: obtain a recommended message including the inputted text using a machine trained language model based on a text being input, and control the communicator to transmit the recommended message to an external electronic apparatus based on receiving an input for transmitting the recommended message, and obtain the recommended message by applying the inputted text and one or more message transmitted and received between the communicator and the external electronic apparatus prior to the text being input to the language model.

The processor may be configured to control the electronic apparatus to obtain contextual information on the one or more message transmitted and received prior to the text input, and using a word corresponding to the inputted text and the obtained contextual information, obtain the recommended message including the word as a primary word and following the one or more message transmitted and received prior to the text being input.

In addition, the processor may be configured to control the electronic apparatus to, based on a first word corresponding to a first text inputted, a second word corresponding to a second text inputted after the first text is input, and one or more message transmitted and received between the communicator and the external electronic apparatus prior to the first text being input, obtain the recommended message including the first word and the second word, and the obtained recommended message may include the first word as a primary word and the second word as a secondary word.

In addition, the electronic apparatus may further include a storage configured to store the language model including an embedding matrix and a softmax matrix trained with recurrent neural network (RNN) as primary data including a plurality of sentences, and the processor may be configured to control the electronic apparatus to obtain the recommended message including the inputted text using the stored language model.

The processor may be configured to control the electronic apparatus to determine a first predicted word following the word corresponding to the inputted text by applying a sentence corresponding to the one or more message transmitted and received prior to the text being input and a word corresponding to the inputted text to the language model, determine a second predicted word following the determined first predicted word by applying the sentence corresponding to the one or more message transmitted and received prior to the text being input, the word corresponding to the inputted text, and the determined first predicted word to the language model, and obtain the recommended message sequentially including the word corresponding to the inputted text, the first predicted word and the second predicted word.

In addition, the processor may be configured to control the electronic apparatus to obtain a plurality of first data mapping a plurality of first vector corresponding to each of punctuation marks and one or more word included in a first sentence of the plurality of sentences to a vector space based on a first random matrix, generate a second data based on the first data, obtain a restoration vector which is restored from the second data based on a second random matrix, update an element of the first random matrix and the second random matrix based on an error between the second vector corresponding to a primary word included in a second sentence following the first sentence and the restoration vector, and store the updated first random matrix and the second random matrix to the storage as the embedding matrix and the softmax matrix respectively.

The processor may be configured to control the electronic apparatus to obtain a plurality of third data mapping the plurality of first vector and the second vector respectively to the vector space based on the first random matrix, generate a fourth data based on the plurality of third data, obtain another restoration vector restored from the fourth data based on the second random matrix, update an element of the first random matrix and the second random matrix based on an error between the third vector corresponding to a secondary word of the second sentence and the another restoration vector restored from the fourth data, and store the updated first random matrix and the second random matrix to the storage as the embedding matrix and the softmax matrix respectively.

Further, the processor may be configured to control the electronic apparatus to update an element of the first random matrix and the second random matrix respectively based on all of the plurality of sentences, and store the first random matrix and the second random matrix where an element is updated based on the remaining sentences to the storage as the embedding matrix and the softmax matrix respectively.

A method of controlling an electronic apparatus according to an example embodiment of the present disclosure includes, obtaining a recommended message including the inputted text using a machine trained language model based on a text being input, and transmitting the recommended message to the external electronic apparatus based on receiving an input for transmitting the recommended message, wherein the obtaining the recommended message includes obtaining the recommended message by applying the inputted text and one or more message transmitted and received between the electronic apparatus prior to the text being input and the external electronic apparatus to the language model.

The obtaining the recommended message may include obtaining contextual information on the one or more message transmitted and received prior to the text being input, and obtaining the recommended message that includes the word as a primary word and follows the one or more message transmitted and received prior to the text being input using the word corresponding to the inputted text and the obtained contextual information.

In addition, the method may further include obtaining the recommended message based on a first word corresponding to a first text inputted, a second word corresponding to a second text inputted after the first text is input, and one or more message transmitted and received between the communicator and the external electronic apparatus prior to the first text being input, and the recommended message may include the first word as a primary word and the second word as a secondary word.

In addition, the method may further include recurrent neural network (RNN) training the language model including the embedding matrix and the softmax matrix as primary data including a plurality of sentences.

Obtaining the recommended message may include determining a first predicted word following the word corresponding to the inputted text by applying a sentence corresponding to the one or more message transmitted and received prior to the text being input and a word corresponding to the text input to the language model, determining a second predicted word following the determined first predicted word by applying the sentence corresponding to the one or more message transmitted and received prior to the text being input, the word corresponding to the inputted text, and the determined first predicted word to the language model, and obtaining the recommended message sequentially including the word corresponding to the inputted text, the first predicted word, and the second predicted word.

In addition, the RNN training the language model may include obtaining a plurality of first data mapping a plurality of first vector corresponding to each of punctuation marks and one or more word included in a first sentence of the plurality of sentences to a vector space based on a first random matrix, generating a second data based on the first data, obtaining a restoration vector restored from the second data based on a second random matrix, updating an element of the first random matrix and the second random matrix based on an error between the second vector corresponding to a primary word included in a second sentence following the first sentence and the restoration vector, and storing the updated first random matrix and the second random matrix to the storage as the embedding matrix and the softmax matrix respectively.

The RNN training the language model may include obtaining a plurality of third data mapping the plurality of first vector and the second vector respectively to the vector space based on the first random matrix, generating a fourth data based on the plurality of third data, obtaining another restoration vector restored from the fourth data based on the second random matrix, updating an element of the first random matrix and the second random matrix based on an error between the third vector corresponding to a secondary word of the second sentence and the another restoration vector restored from the fourth data, and storing the updated first random matrix and the second random matrix to the storage as the embedding matrix and the softmax matrix respectively.

Further, the RNN training the language model may include updating an element of the first random matrix and the second random matrix respectively based on all of the plurality of sentences, and storing the first random matrix and the second random matrix where an element is updated based on the remaining sentences to the storage as the embedding matrix and the softmax matrix, respectively.

A non-transitory computer-readable medium according to an example embodiment of the disclosure may be executed by a processor of an electronic apparatus, the electronic apparatus is configured to obtain a recommended message including the inputted text using a machine trained language model based on text being input, and transmit the recommended message to an external electronic apparatus based on receiving user input for transmitting the recommended message, wherein the obtaining the recommended message includes obtaining the recommended message by applying the inputted text and one or more message transmitted and received between the electronic apparatus and the external electronic apparatus prior to the text being input to the language model.

The electronic apparatus and controlling method thereof according to the present disclosure has the effect of recommending a completed sentence by appropriately determining the user intended sentence in the process of the user inputting the sentence intended by the user even in the case of the user typing one or two words included in the relevant sentence.

For example, the present disclosure is advantageous in that, based on transmitting and receiving messages with the external server, because of using contextual information of previously transmitted and received messages, the accuracy is improved for determining what the sentence intended by the current user is.

BRIEF DESCRIPTION OF THE DRAWINGS

The above and/or other aspects, features and advantages of certain embodiments of the present disclosure will be more apparent from the following detailed description, taken in conjunction with the accompanying drawings, in which.

DETAILED DESCRIPTION

Figure 1A:
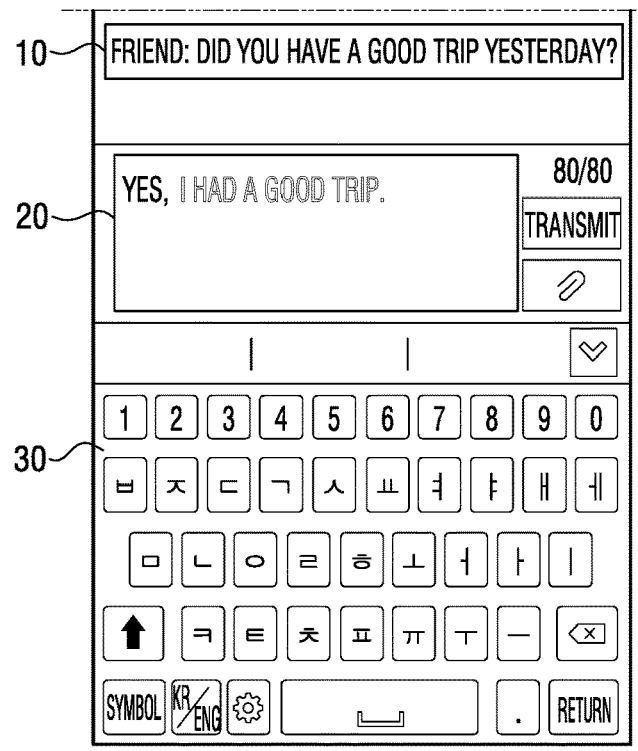
FIGS. 1A and 1B are diagrams illustrating an example of an electronic apparatus providing a recommended sentence according to various embodiments of the present disclosure.

Before describing the present disclosure, terms of the present disclosure and drawings will be described.

The terms used in the present disclosure are general terms identified in consideration of the functions of the various example embodiments of the disclosure. However, these terms may vary depending on intention, legal or technical interpretation, emergence of new technologies, and the like of those skilled in the related field of art. Also, there may be some arbitrary terms. Unless there is a specific definition of a term, the term may be construed based on the overall contents and technological common sense of those skilled in the related art.

Further, like reference numerals or symbols indicate like components or elements that perform substantially the same functions throughout the disclosure. For convenience of descriptions and understanding, the same reference numerals or symbols are used and described in different example embodiments. In other words, although elements having the same reference numerals are all illustrated in a plurality of drawings, the plurality of drawings do not refer to only one embodiment.

The terms including ordinal numbers such as "first," "second," and so on may be used to differentiate between elements in the present disclosure. However, these ordinal numbers are used merely to distinguish same or similar elements from another, and should not be understood as limiting the meaning of the terms as a result of using these ordinal numbers. For example, the elements associated with the ordinal numbers should not be limited in order or order of use by the numbers.

A singular expression in the present disclosure includes a plural expression, unless otherwise specified clearly in context. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In the embodiments of the present disclosure, terms such as "module," "unit," "part", and so on may be used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

In addition, in the various example embodiments described herein, when any part is indicated as following another part, this includes not only a direct connection, but also an indirect connection through another medium. Further, when a certain part includes a certain element, unless specified to the contrary, an another element may be additionally included, rather than precluding another element.

Figure 1B:
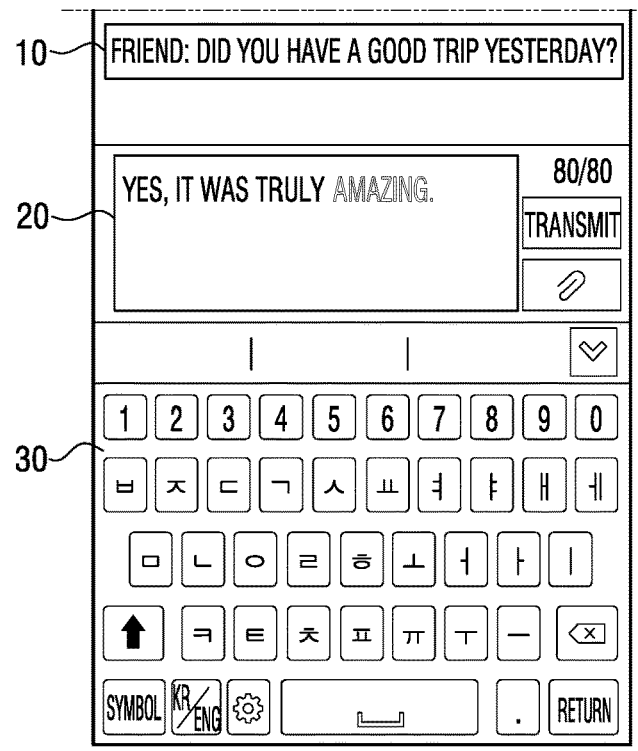

FIGS. 1A and 1B are diagrams illustrating an example of an electronic apparatus according to the present disclosure providing a recommended sentence. FIGS. 1A and 1B, based on having executed an application for exchanging messages with an external electronic apparatus, show a screen including a user interface (UI) for the relevant application. The screen is displayed in the electronic apparatus.

FIGS. 1A and 1B are premised on a situation of exchanging messages with an external electronic apparatus of a 'friend' through an application executed in the electronic apparatus. Referring to FIGS. 1A and 1B, it can be seen that a message 10 indicating "Did you have a good trip yesterday?" was received from an external electronic apparatus of a 'friend' and in a shown state on the screen.

In FIG. 1A, in the process of a user inputting a message through a touch of the graphic keypad 30 in order to respond to the message 10 received from the external electronic apparatus of a 'friend', a situation of a text indicating "Yes," having been input in the input window 20 is shown. The electronic apparatus according to the present disclosure, considers the contextual information of the sentence "did you have a good trip yesterday?" and the currently inputted text "Yes," determines the message intended by the user, and recommends a message.

Referring to FIG. 1A, since the part "I had a good trip" that is not yet input is automatically displayed in a lighter color than "Yes," it can be seen that the sentence "Yes, I had a good trip." has been recommended through the input window 20.

Based on receiving input for selecting a recommended sentence from a user, the sentence "Yes, I had a good trip." may be displayed darkly in the input window 20 as if it was inputted by the actual user and thereafter, the message "Yes, I had a good trip." may be transmitted to the external electronic apparatus according to the user transmit instruction. Also, the relevant message may be transmitted instantly to an external electronic apparatus of a 'friend' from input alone for selecting the recommended sentence.

Based on a situation where the input for selecting the recommended sentence is not received from the user in FIG. 1A, FIG. 1B shows a situation of a text "It was truly" being input additionally to the input window 20 from the user. At this time, the electronic apparatus according to the present disclosure, considering the contextual information of the sentence "Did you have a good trip yesterday?" and the currently inputted text "Yes, it was truly", determines the message intended by the user and may recommend a message.

Referring to FIG. 1B, since the part "amazing." not yet input is shown automatically in a lighter color than "Yes, it was truly", it can be seen that the sentence "Yes, it was truly amazing." is being recommended through the input window 20.

Accordingly, the electronic apparatus according to the present disclosure may use contextual information of the previously transmitted and received message to recommend a sentence that includes all of the words and/or punctuation marks input by the user according to the order of input by the user.

Hereinbelow, an example configuration and operation of the electronic apparatus capable of recommending a sentence as in FIG. 1 will be described. The screen shown in FIGS. 1A and 1B is merely one example of an electronic apparatus according to the present disclosure providing a UI, and the UI provided by the electronic apparatus may be provided audibly and not provided visually as in FIG. 1. Further, even if a UI is provided visually as in FIG. 1, the placement of a message/a input window/a keypad or the like, the form of display type of a recommended sentence, configuration of a screen, or the like may be different from that of FIGS. 1A and 1B. Further, the input form of a message may not also be limited to a graphic keyboard as in FIGS. 1A and 1B.

Figure 2:
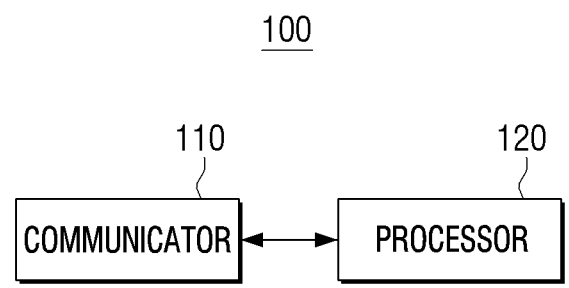
FIG. 2 is a block diagram illustrating an example configuration of an example electronic apparatus according to an embodiment of the present disclosure.

FIG. 2 is a block diagram illustrating an example configuration of an electronic apparatus 100 according to an embodiment of the present disclosure. The electronic apparatus 100 may, for example, and without limitation, be a smartphone, a notebook PC, a desk top PC, a tablet PC, a monitor, a TV, a kiosk, or the like. Further, the electronic apparatus 100 may be implemented through a set-top box, a server, or the like.

Referring to FIG. 2, the electronic apparatus 100 may include a communicator (e.g., including communication circuitry) 110 and a processor (e.g., including processing circuitry) 120.

The communicator 110 may include various communication circuitry for performing data communication via wireless or wire with one or more external apparatus (not shown). The processor 120 may include various processing circuitry and perform communication with various external devices using the communicator 110.

Based on performing data communication with an external apparatus through a wireless communication method, the communicator 110 may include various communication modules including various communication circuitry, such as, for example, and without limitation, at least one from a WiFi direct communication module, a Bluetooth module, an infrared data association (IrDA) module, a near field communication (NFC) module, a Zigbee module, a cellular communication module, a 3rd generation (3G) mobile communication module, a 4th generation (4G) mobile communication module, a 4G long term evolution (LTE) communication module, or the like.

Based on performing data communication with the external apparatus through wire communication method, the communicator 110 may perform communication with a local area network (LAN) connected to a coaxial cable, optical fiber cable, and the like to transmit and receive various data.

The processor 120 may control the overall operation of the electronic apparatus 100.

The functions related to the artificial intelligence according to the present disclosure is operated through the processor 120 and the memory. The processor 120 may be configured of one or a plurality of processors. The one or plurality of processors may be a universal processor such as a CPU, AP, and digital signal processor (DSP), a graphic dedicated processor such as GPU and vision processing unit (VPU) or an artificial intelligence dedicated processor such as a NPU. The one or plurality of processor, based on the pre-defined operation rules stored in the memory, may control to process the input data. Further, if the one or plurality of processors is an artificial intelligence dedicated processor, the artificial intelligence dedicated processor may be designed in a hardware structure specialized in a specific artificial intelligence model processing.

The pre-defined operation rule or artificial intelligence model is characterized by being made through learning. Herein, being made through learning refers to a basic artificial intelligence model, based on learning using a plurality of learning data by a learning algorithm, making a pre-defined operation rule or an artificial intelligence model set to perform a desired feature (or purpose). This learning may be achieved in the device itself performing artificial intelligence or through a separate server and/or system according to the present disclosure. As an example of the learning algorithm, a semi-supervised learning or a reinforcement learning may be provided, but are not limited thereto.

The artificial intelligence model may be configured with a plurality of neural network layers. Each of the plurality of neural network layers have a plurality of weight values, and performs neural network calculation through calculation between the calculated result of the previous layer and the plurality of weight values. The plurality of weight values held by the plurality of neural network layers may be optimized according to the learning results of the artificial intelligence model. For example, the plurality of weight values may be updated for the loss value or the cost value, obtained in the artificial intelligence model during the learning process, to be reduced or minimized. The artificial neural network may include a deep neural network (DNN), and may be implemented, for example, as a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep Q-Networks, or the like, but are not limited thereto.

The processor 120 may control the communicator 110 to transmit and receive one or more message with the external electronic apparatus (not shown). The external electronic apparatus (not shown) may be various electronic devices such as, for example, and without limitation, a smartphone, a server, a desktop PC, a tablet PC, a notebook PC, or the like, capable of communicating electronically.

For example, the processor 120 may control the communicator 110 to transmit and receive data on the content of the message, the subjects of transmitting and receiving message, time at which the message was transmitted, and the like with the external electronic apparatus (not shown). The subject that sent the message may correspond to the identifying information of an apparatus transmitting or receiving the message.

The transmission and reception of a message between the communicator 110 and external electronic apparatus (not shown) may not be a direct communication but may be through a different device such as a server. For example, the processor 120 may control the communicator 110 to transmit and receive message with the external electronic apparatus through an external apparatus (not shown) connected to the communicator 110 and the external electronic apparatus (not shown), respectively.

In addition, the transmission and reception of a message may be performed between the electronic apparatus 100 and the external electronic apparatus, based on being connected to the input and output port (not shown) of the electronic apparatus 100 and through the external apparatus (not shown) capable of communicating with the external electronic apparatus (not shown). In terms of the electronic apparatus 100 including an input and output port, the detailed description of the configuration of the input and output port will be described below with FIG. 5.

The processor 120, based on a text being input, may obtain a recommended message including the inputted text using a machine trained language model. For example, a recommended message may be obtained by applying the inputted text and one or more message transmitted and received between the communicator 110 and the external electronic apparatus prior to text input to the language model. The machine trained language model will be described in greater detail below with reference to FIGS. 3 to 4.

The text may be directly input to the electronic apparatus 100 through a user input unit (not shown) of the electronic apparatus 100 or input to another external apparatus (not shown) and then the information thereof may be transmitted to the electronic apparatus 100. For example, based on receiving user instruction to input a specified text to a user input unit (not shown), the relevant text may be input to the electronic apparatus 100.

The processor 120 may obtain contextual information on one or more message transmitted and received prior to text input. Further, the recommended message may be obtained using the word corresponding to the inputted text and the obtained contextual information. In this case, the recommended message includes the word corresponding to the inputted text as a primary word, and may be a message following one or more message transmitted and received prior to text input.

For example, the processor 120, from the plurality of pre-stored messages, may identify a message including a word corresponding to the inputted text having content to follow one or more message transmitted and received prior to text input as a primary word. The pre-stored plurality of message may include a predetermined message, one or more word and/or sentence corresponding to previously inputted text, or the like.

Based on the inputted text including not only words but also punctuation marks, the processor 120 may obtain the recommended message also considering the punctuation marks.

The one or more message transmitted and received prior to text input may be a message transmitted and received within the predetermined time from the text input. Further, it may be messages that include the message transmitted and receive at a time closest to the time of text input to the message transmitted and received at a time closest to a nth time ('N' is a predetermined number). Further, it may include the message transmitted with a predetermined time from the time of text input and/or the message received within a predetermined time from the time of text input.

Contextual information may, for example, be information on a word and punctuation mark included in one or more specific message. For example, contextual information may be information on the content of each word included in a specific message, part of a speech, and order. Such contextual information may be obtained using a machine trained language model, and the specific embodiments related thereto will be described in greater detail below with reference to FIGS. 3 to 4.

Using the above described FIG. 1A as an example, the processor 120 uses the contextual information of the message "Did you have a good trip yesterday?" and the text "Yes," to obtain the sentence "Yes, I had a good trip." as a recommended message.

Based on the word corresponding to the inputted text being two or more words, the processor 120 uses the contextual information of one or more message transmitted and received prior to text input and the two or more words to obtain the recommended message that includes all of the two or more words.

For example, the processor 120, based on the second word corresponding to the second text inputted after inputting one or more message transmitted and received between the communicator 110 and the external electronic apparatus prior to the first text input, the first word corresponding to the first text, and the first text, may obtain the recommended message including the first word as the primary word and the second word as the secondary word.

When there are three or more words and/or punctuation marks corresponding to the inputted text, the processor 120 may likewise obtain the recommended message that includes the corresponding word and/or punctuation mark according to input order.

Using the above described FIG. 1B as an example, the processor 120 uses the contextual information of the message "Did you have a good trip yesterday?" and the word "Yes," and the word "it was truly" to obtain the recommended message "Yes, it was truly amazing.".

The processor 120, after obtaining the recommended message including one or more words corresponding to the inputted text such as the above, may provide the identified sentence as the recommended sentence to the user visually or audibly.

The processor 120, based on receiving an input (e.g., a user input) to transmit the provided recommended message to the external electronic apparatus, may control the communicator 110 to transmit the recommended message to the external electronic apparatus.

Figure 3:
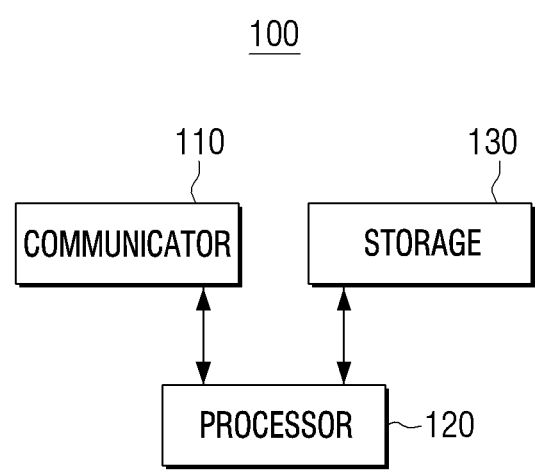
FIG. 3 is a block diagram illustrating an example configuration of an example electronic apparatus including a storage stored with a language model according to an embodiment of the present disclosure.
Figure 4:
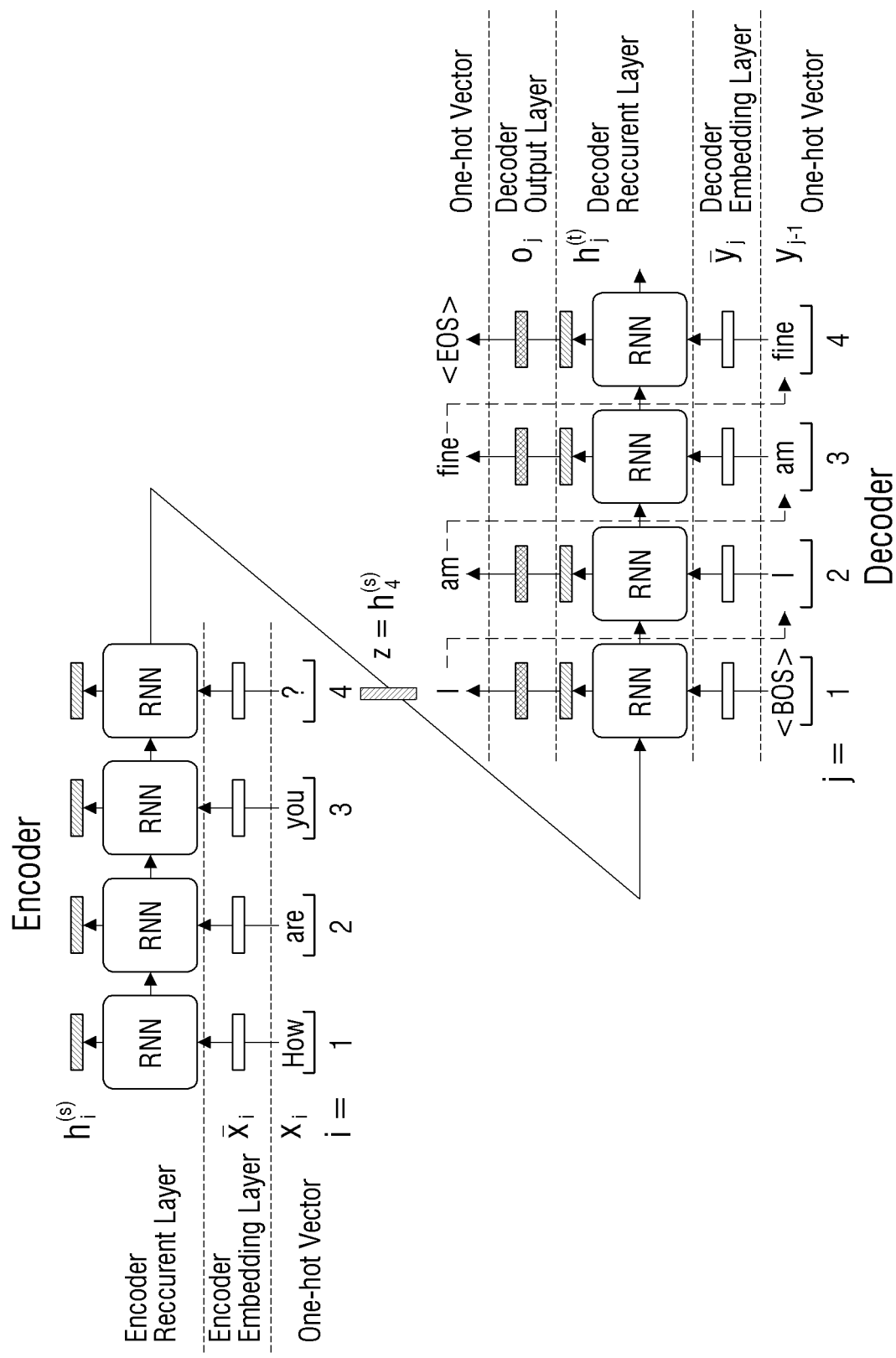
FIG. 4 is a diagram illustrating an example of sequentially predicting the next word based on contextual information of a message transmitted and received prior to text input according to an embodiment of the present disclosure.

In FIGS. 3 to 4 below, in identifying the sentence including one or more word corresponding to the inputted text, embodiments using the machine trained language model will be described.

FIG. 3 is a block diagram illustrating an example configuration of an electronic apparatus 100 including a storage stored with a language model according to an embodiment of the present disclosure.

Referring to FIG. 3, the electronic apparatus 100 in addition to the communicator (e.g., including communication circuitry) 110 and processor (e.g., including processing circuitry) 120 shown and described in FIG. 2, may further include a storage 130.

The storage 130 may be configured to store an operating system (OS) for controlling the overall operation of the elements of the electronic apparatus 100 and the instructions or data corresponding to the elements of the electronic apparatus 100.

The storage 130 may be implemented, for example, and without limitation, as a non-volatile memory (for example, hard disk, a solid state drive (SSD), flash memory), a volatile memory, or the like.

The storage may store an application and/or task that allows the user to transmit and receive message with one or more external electronic apparatus (not shown) through the electronic apparatus 100.

A language model including a recurrent neural network (RNN) trained embedding matrix and softmax matrix may be stored as primary data including the plurality of sentences in the storage 130, and the processor 120 uses the stored language model to obtain the recommended message including the inputted text.

RNN may refer, for example, to a recurrent neural network, which is a type of deep running model for training data which changes according to the flow of time like the clock column data. A specific method of RNN training will be described in greater detail below together with embedding matrix and softmax matrix. The plurality of sentences may include a predetermined sentence, one or more sentence corresponding to previously received user input, or the like.

The processor 120 may predict sequentially following words one at a time while obtaining the completed sentence (recommended message).

For example, the processor 120 may apply a sentence corresponding to one or more message transmitted and received prior to text input and a word corresponding to the inputted text to the language model to determine a first predicted word after the word corresponding to the inputted text. Further, the sentence corresponding to one or more message transmitted and received prior to text input, the word corresponding to the inputted text, and the first predicted word are applied to the language model, and a second predicted word after the determined first predicted word may be determined. Based on predicting sequentially following words one at a time, the processor 120 may identify the message including the word corresponding to the inputted text, the first predicted word, and the second predicted word sequentially.

The language model may be trained to identify the word following the inputted word as a result of receiving input of one or more sentence and one or more word, and the trained data may be stored as an element of the embedding matrix and/or softmax matrix included in the language model.

The language model stored in the storage 130 may be trained in the external apparatus (not shown) such as a server or may be trained by the processor 120. The following is described based on the premise the processor 120 trains the language model.

The processor 120 may obtain a plurality of first data mapping one or more word included in the first sentence from the plurality of sentences and the plurality of first vector corresponding to each of punctuation marks to a vector space based on a first random matrix.

For example, based on the first sentence being "I am a girl.", the processor 120 may obtain a plurality of vectors corresponding to "I", "am", "a", "girl", "." respectively. At this time, the plurality of first vectors may be vectors having a size of 1×m, respectively, and here m may be determined according to the type of text included in the primary data used in training the language model. For example, if there are 15000 texts different from each other in the primary data, the vector corresponding to each text may be a vector having a size of 1×15000. Further, the text may be determined according to only one from the 15000 columns of the vector having a value of 1, the remaining having a value of 0, and the position of the column having a value of 1. For example, "I" may be shown based on the value of the first column from among the 15000 columns being 1, and "you" may be shown based on the value of the second column from among the 15000 columns being 1. Based on this method, the processor 120 may obtain the plurality of first vectors corresponding to each text included in the first sentence.

The first random matrix may be a matrix having m (line)×n (column) number of random elements, and may be a matrix for mapping the first vector to a nth dimensional vector space. For example, the processor 120 may obtain a plurality of first data mapping each of the plurality of the first vector by multiplying with the first random matrix to a nth dimensional vector space.

The processor 120 may generate a second data based on the first data. For example, processor 120 may generate a second data from the plurality of first data using a long-short term memory (LSTM) method. The LSTM method may refer, for example, to a conventional technology and thus a detailed description thereof will be omitted. Further, the processor 120 may generate the second data by weighted summing the plurality of first data.

Accordingly, the plurality of first data corresponding to each text included in the first sentence, the second data generated from the plurality of first data, and the like may be included in the concept of contextual information corresponding to the first sentence.

The processor 120 may obtain a restoration vector which is restored from the second data based on a second random matrix. Here the second random matrix may be a matrix having n (line)×m (column) number of random elements, and may be a matrix for restoring the data mapped in the nth dimension to a vector. That is, a transposed matrix of the first random matrix and the second random matrix may be same in size. The restoration vector may be a vector having a size of 1×m, but the value of each column has a value between 0 and 1, and may be 1 if the value of all columns are added.

The processor 120, after identifying that the sentence that may follow the first sentence is a second sentence through the primary data, may update an element of the first random matrix and the second random matrix based on an error between the second vector corresponding to a primary word included in the second sentence and the restoration vector. At this time, the sentence that may follow the first sentence is not limited to one sentence.

Further, the processor 120 may train the language model by storing the updated first random matrix and the second random matrix to the storage 130 as embedding matrix and softmax matrix, respectively.

The processor 120 may train the language model for not only the first sentence and the primary word included in the second sentence, but also the secondary word and thereafter included in the second sentence.

For example, the processor 120 may obtain a plurality of third data mapping the plurality of first vector and the second vector respectively to the vector space based on the first random matrix, generate a fourth data based on the plurality of third data, and obtain a restoration vector restored from the fourth data based on the second random matrix. In this case, an element of the first random matrix and the second random matrix may be updated based on an error between the third vector corresponding to the secondary word of the second sentence and the restoration vector restored from the fourth data. Further, the updated first random matrix and the second random matrix may be stored in the storage 130 as embedding matrix and softmax matrix, respectively.

The processor 120 may train the language model using the word included in the second sentence sequentially.

In addition, the above described embodiment merely discloses using the first sentence from the plurality of sentences to train about the second sentence to follow thereafter, but the processor 120 may update an element of the first random matrix and the second random matrix respectively based on all of the plurality of sentences in addition to the first sentence. For example, the processor 120 may train the language model on each of the words (and/or punctuation marks) within the sentence that follows each of the different remaining sentences other than the first sentence from the plurality of sentences.

Further, with respect to each of the remaining sentences, the updated first random matrix and the second random matrix may be stored in the storage 130 as embedding matrix and softmax matrix, respectively.

The transposed matrix of the embedding matrix and softmax matrix may be identical in size. Further, transposed matrix of the embedding matrix and softmax matrix may be different from each other in element. Accordingly, even if the same sentence and/or word is input, the recommended word may be different.

Through the trained language model as indicated above, the processor 120 may use a word corresponding to one or more message (sentence) transmitted and received prior to text input and the inputted text to obtain an appropriate sentence (recommended message). Specifically, the recurrent neural network (RNN) applied to the language model may be used.

FIG. 4 is a diagram illustrating an example of sequentially predicting the next word based on contextual information of a message transmitted and received prior to text input. FIG. 4 illustrates an example sequential word prediction process through the recurrent neural network (RNN) applied with the trained language model.

FIG. 4 discloses an encoder generating contextual information of an input sentence and a decoder identifying the sentence following the inputted sentence using the contextual information of an inputted sentence.

The decoder may sequentially identify words highly probable of following the inputted sentence using the contextual information generated in the encoder, and as a result thereof, obtains the sentence including the sequentially identified words in real-time.

Referring to FIG. 4, based on the sentence "How are you?" being received in the encoder, the processor 120 may obtain a plurality of first vector $(x_1, x_2, x_3, x_4)$ corresponding to each of the "How", "are", "you", "?" inputted sequentially. Each of the first vector may correspond to one-hot vector, in which only one column is 1 and the remaining columns are 0 as a matrix having a size of 1×m.

In this case, the processor 120 may obtain the plurality of first data $(\bar{x}_1, \bar{x}_2, \bar{x}_3, \bar{x}_4)$ by applying embedding matrix to the plurality of first vector through an Encoder Embedding Layer.

In addition, through the encoder recurrent layer, the second data may be generated by applying the plurality of first data sequentially according to the order (i) of the corresponding text inputted. If the case of FIG. 4, the first data corresponding to "How", the first data corresponding to "are", the first data corresponding to "you", and the first data corresponding to "?" were sequentially applied to generate data $(z=h_4^{(s)})$.

The processor 120, may then use the decoder to determine the word following after the sentence "How are you?" At this time, the word corresponding to the inputted text may be considered additionally.

For example, a case of text not being inputted or a case of text being inputted may be assumed. FIG. 4 relates to the case of the text not being inputted.

Referring to FIG. 4, since the text is not inputted, the processor 120 applies the softmax matrix to the data $(z=h_4^{(s)})$ through a decoder output layer to obtain the restoration vector, and it can be seen that the obtained restoration vector corresponds to "I".

The processor 120, through the decoder recurrent layer, may obtain a result data by further applying data $(\bar{y}_2)$ corresponding to not only data $(z=h_4^{(s)})$ but also "I", and may identify the word "am" to follow after "I" as shown in FIG. 4 as a result of applying the softmax matrix to the result data through the decoder output layer. Further, based on further applying data corresponding to "am", may obtain one sentence ("I am fine") by identifying "fine" to follow after "am" as a result of further applying the data corresponding to "am" as the recommended message.

Unlike FIG. 4, based on a text being inputted following "How are you?", the processor may identify the next word by inputting the word corresponding to the inputted text in addition to "How are you?" to the encoder. For example, based on a text corresponding to "I" being inputted, the processor 120 may obtain the third data using the plurality of first data corresponding to "How", "are", "you", "?", respectively and the second data corresponding to "I", and may identify "am" following "I" by inputting the third data to the decoder. Further, the processor, additionally considering "am", may identify the next word "fine" following "am". Accordingly, the processor may obtain the recommended message of "I am fine".

Figure 5:
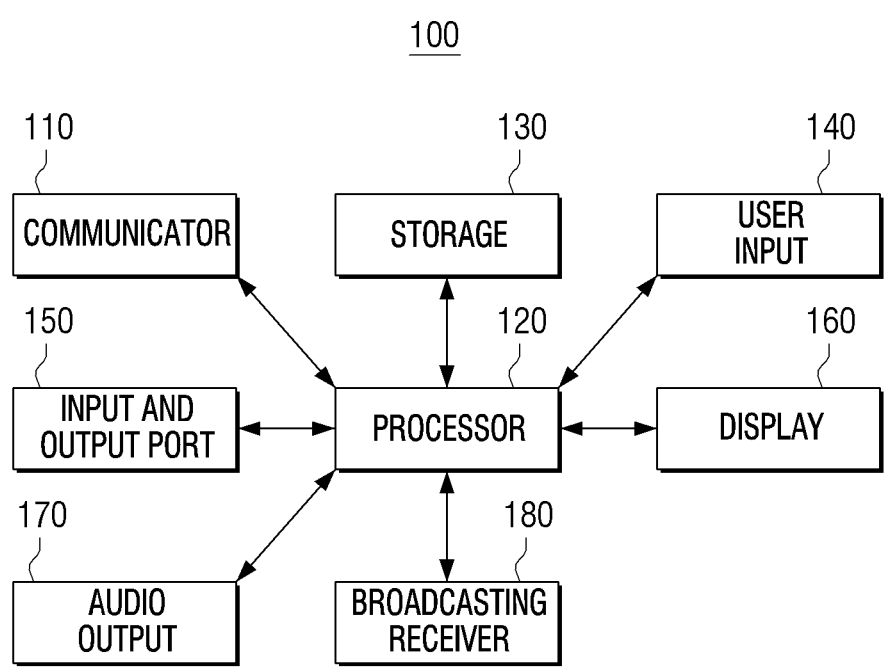
FIG. 5 is a block diagram illustrating an example configuration of an example electronic apparatus according to various embodiments of the present disclosure.

FIG. 5 is a block diagram illustrating an example configuration of an electronic apparatus 100 according to various embodiments of the present disclosure.

Referring to FIG. 5, the electronic apparatus 100, in addition to the communicator (e.g., including communication circuitry) 110 and the processor (e.g., including processing circuitry) 120, may further include at least one of a storage, a user input (e.g., including user input circuitry) 140, an input and output port 150, a display 160, an audio output (e.g., including audio output circuitry) 170 and a broadcast receiver (e.g., including broadcast receiving circuitry) 180.

The user input 140 may include various input circuitry and may be configured such that the electronic apparatus 100 is able to receive user input including instructions or information from the user.

The electronic apparatus 100 may receive at least one text input through the user input 140, and may receive user instruction to select the recommended message provided by the electronic apparatus 100. Further, the electronic apparatus may receive user instruction to transmit the recommended message through the user input 140.

The user input 140 may include various user input circuitry, such as, for example, and without limitation, at least one button, a keyboard, a mouse (not shown), or the like. Further, the user input 140 may include a touch panel (not shown) or a separate touch pad (not shown) implemented with the display to receive input on user input/instructions in touch form.

The user input 140 may include at least one text or a microphone (not shown) for receiving input of at least one text or instructions in voice form.

The electronic apparatus 100, through the input and output port 150, may receive a signal concerning a text, an image, or voice from the outside or may transmit a signal concerning a text, an image or voice to the outside.

The input and output port 150 may, for example, and without limitation, be implemented as a wired port such as a a high definition multimedia interface (HDMI) port, a display port, a RGB port, a digital visual interface (DVI) port, a Thunderbolt, component port, or the like. Further, the input and output port 150 may be implemented as ports for wireless communication such as, for example, and without limitation, WiFi, Bluetooth, or the like, communication.

The input and output port 150 may include an interface module such as a universal serial bus (USB), and through the interface module, may transmit or receive data on a text, a voice, and an image or may transmit and receive firmware data to perform firmware upgrade by being physically connected to an external terminal apparatus such as a PC.

The display 160 may be a configuration to display one or more image. The display 160 may, for example, and without limitation, be implemented as a liquid crystal display (LCD), plasma display panel (PDP), organic light emitting diodes (OLED), transparent OLED (TOLED), and the like. Based on being configured as an LCD, a driving circuit (not shown), a backlight unit (not shown), and the like capable of being implemented in the same form as an a-si TFT, low temperature poly silicon (LTPS) TFT, organic TFT (OTFT), and the like in the display 160 may be also included.

The display 160 may be implemented in touchscreen form included with a touch panel capable of detecting a touch manipulation of a user, and in this case, it can be seen included in the user input 140.

The processor 120 may include various processing circuitry and control the display 160 to display the screen of the application to transmit and receive a message with the external electronic apparatus (not shown). The processor 120 may control the display 160 to display at least one from the recommended message obtained according to inputted text, the message transmitted and received prior to text input, the word corresponding to the inputted text, and the contextual information of a message transmitted and received prior to text input.

The audio output 170, as a configuration to output voice, may include various audio output circuitry and may be implemented, for example, and without limitation, as a headphone/earphone output terminal (not shown).

The processor 120 may control the audio output 170 to output the recommended message in voice form.

The broadcast receiver 180 may include various broadcast receiving circuitry and receive signal related to broadcast content. The broadcast content may include date on a text, a video image, an audio, and the like, and the broadcast receiver 180 may receive broadcast content signal from various sources such as ground wave broadcast, cable broadcast, satellite broadcast, and internet broadcast.

The broadcast receiver 180 may, for example, and without limitation, be implemented in a form comprising a configuration such as a tuner (not shown), a demodulator (not shown), an equalizer (not shown), or the like to receive broadcast content transmitted from a broadcast station.

Figure 6:
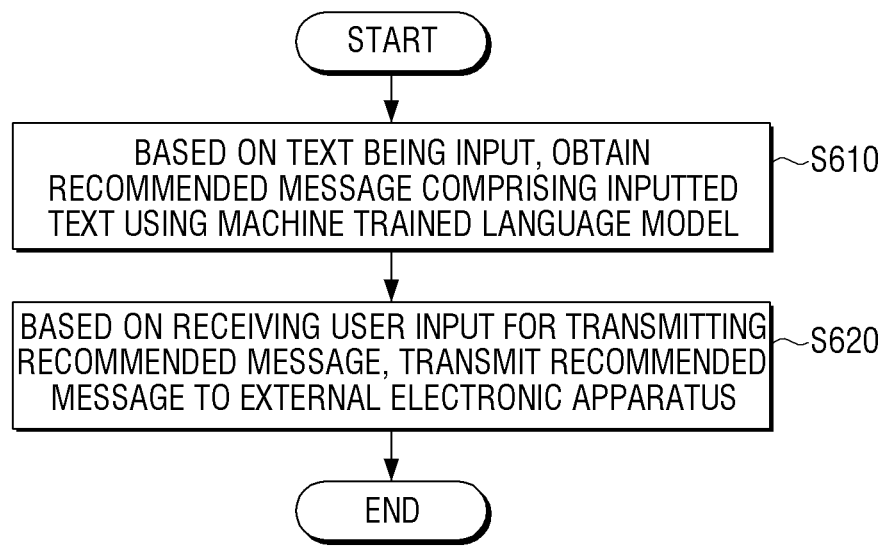
FIG. 6 is a flowchart illustrating an example method of controlling an electronic apparatus according to an embodiment of the present disclosure.
Figure 7:
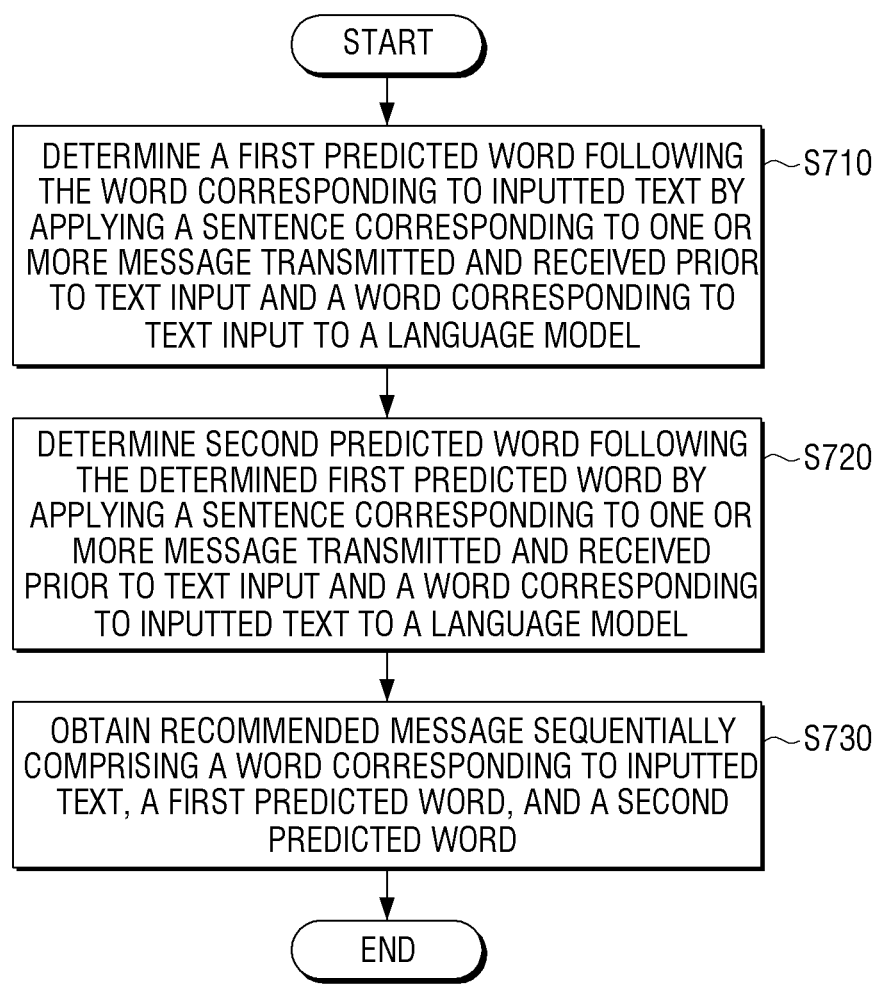
FIG. 7 is a flowchart illustrating an example method of controlling an electronic apparatus to obtain a recommended message (e.g., sentence) according to an embodiment of the present disclosure.

With reference to FIGS. 6 to 7 below, a controlling method of the electronic apparatus according to the present disclosure will be described in greater detail below.

FIG. 6 is a flowchart illustrating an example method of controlling an electronic apparatus according to an embodiment of the present disclosure.

Referring to FIG. 6, the method, based on a text being inputted, may use the trained language model to obtain the recommended message including the inputted text S610. Further, based on user input being received to transmit the recommended message, the recommended message may be transmitted to the external electronic apparatus S620. The text may be directly inputted to the electronic apparatus by user instruction regarding the electronic apparatus or may be inputted to another external apparatus (not shown), after which the information may be transmitted to the electronic apparatus.

In obtaining the recommended message S610, one or more message transmitted and received between the electronic apparatus and the external electronic apparatus prior to inputted text and text input is applied to the language model to obtain the recommended message.

For example, the recommended message including the word as a primary word and following the one or more message transmitted and received prior to text input may be obtained by obtaining the contextual information on one or more message transmitted and received prior to text input and using the word corresponding to the inputted text and the obtained contextual information.

For example, based on the electronic apparatus receiving message "How are you?" from the external electronic apparatus prior to the text corresponding to "I" being input, the sentence of "I am fine." which includes "I" as a primary word and follows the message "How are you?" may be obtained as a recommended sentence using the contextual information on "How are you?" and the inputted "I".

The contextual information may be information on a word or punctuation mark included in one or more specific message. For example, the contextual information may be information the content of a word, part of a speech and order included in a specific message. The contextual information such as the above may be obtained using a machine trained language model.

Further, the controlling method may obtain the recommended message including a first word and a second word based on one or more message transmitted and received between the electronic apparatus and the external electronic apparatus prior to the first word corresponding to the inputted first text, the second word corresponding to the inputted second text after the first text input, and the first text being input. The recommended message may include the first word as a primary word, and the second word as a secondary word.

For example, based on the text corresponding to "I" and the text corresponding to "am" being sequentially input after the electronic apparatus receives the message "How are you?" from the external electronic apparatus, the sentence "I am fine." which includes "I" as a primary word and "am" as a secondary word, and follows the message "How are you?" may be obtained as a recommended sentence using the contextual information on "How are you?" and the inputted "I" and "am".

Further, the controlling method may recurrent neural network (RNN) train the language model including the embedding matrix and softmax matrix as primary data including a plurality of sentences.

A plurality of first data mapping one or more word included in the first sentence from the plurality of sentences and a plurality of first vector corresponding to each of punctuation marks to a vector space based on a first random matrix may be obtained, a second data based on the first data may be generated, a restoration vector that restores the second data based on a second random matrix may be obtained, and an element of the first random matrix and the second random matrix based on an error between the second vector corresponding to the primary word included in the second sentence following the first sentence and the restoration vector may be updated. Further, the updated first random matrix and the second random matrix may be stored in the storage of the electronic apparatus as embedding matrix and softmax matrix, respectively.

In this example, the plurality of third data mapping the plurality of first vector and the second vector respectively to the vector space based on the first random matrix may be obtained, a fourth data based on the plurality of third data may be generated, the restoration vector that restores the fourth data based on the second random matrix may be obtained, and an element of the first random matrix and the second random matrix based on an error between the third vector corresponding to the secondary word of the second sentence and the restoration vector that restores the fourth data may be updated. Further, just like the above, the updated first random matrix and the second random matrix may be stored in the storage of the electronic apparatus as embedding matrix and softmax matrix, respectively.

In addition, an element of the first random matrix and the second random matrix respectively based on all of the plurality of sentences, and not just the first sentence, may be updated. At this time, the same method as described above that updates based on the first sentence may be used. Further, the updated first random matrix and the second random matrix may be stored in the storage of the electronic apparatus as embedding matrix and softmax matrix, respectively.

In the training process described above, although the embedding matrix and the softmax matrix has been described as being stored in the storage of the electronic apparatus, in another example, the trained embedding matrix and the softmax matrix may be stored in the storage of an external apparatus based on the training results of the language model through an different external apparatus that is not the electronic apparatus and used.

FIG. 7 is a flowchart illustrating an example method of controlling an electronic apparatus according to an embodiment of the present disclosure obtaining a recommended message (e.g., a sentence).

Referring to FIG. 7, the method may determine a first predicted word after the word corresponding to the inputted text by applying a sentence corresponding to one or more message transmitted and received prior to text input and a word corresponding to text input to the language model S710. For example, based on the text corresponding to "I" being input after receiving the message "How are you?", "am" following "I" may be determined as the first predicted word by applying "How are you?" and "I" to the language model.

In addition, a second predicted word following the determined first predicted word may be determined by applying a sentence corresponding to one or more message transmitted and received prior to text input, a word corresponding to the inputted text, and the determined first predicted word to the language model S720. For example, "How are you?", "I", and "am", may be applied to the language model and "fine" following "am" may be determined as the second predicted word.

Further, the recommended message sequentially including the word corresponding to the inputted text, a first predicted word, and a second predicted word may be obtained S730. Based on the above-described examples, the recommended message is "I am fine.".

The method of the electronic apparatus illustrated and described through FIGS. 6 to 7 may be implemented through the electronic apparatus 100 shown and described through FIGS. 2 to 3 and 5.

The method of controlling the electronic apparatus illustrated and described through FIGS. 6 to 7 may be implemented through the system including the electronic apparatus 100 and one or more external apparatus (not shown).

For example, while the process of obtaining the recommended message using the training of the language model and the language model is being carried out in the server (not shown), the electronic apparatus 100 may only transmit and receive a message with the external electronic apparatus (not shown) or provide a recommended message.

For example, the electronic apparatus 100 may transmit the information on the message transmitted and received with the external electronic apparatus and the information on the inputted text to a server (not shown), and the server (not shown) may transmit information on the recommended message after obtaining the recommended message by applying the received information to the language model to the electronic apparatus 100. Further, the electronic apparatus 100 may provide the recommended message to the user.

The various example embodiments described above may be implemented in a recordable medium which is readable by computer or a device similar to computer using software, hardware, or the combination of software and hardware.

By hardware implementation, the embodiments of the disclosure may be implemented using, for example, and without limitation, at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for performing other functions, or the like.

In some cases, embodiments described herein may be implemented by the processor 120 itself. According to a software implementation, embodiments such as the procedures and functions described herein may be implemented with separate software modules. Each of the above-described software modules may perform one or more of the functions and operations described herein.

The computer instructions for performing the processing operations in the electronic apparatus 100 according to the various embodiments described above may be stored in a non-transitory computer-readable medium. The computer instructions stored in this non-transitory computer-readable medium cause the above-described specific device to perform the processing operations in the electronic apparatus 100 according to the above-described various embodiments when executed by the processor of the specific device.

The non-transitory readable medium may refer, for example, to a medium that stores data semi-permanently, and is readable by an apparatus. For example, the aforementioned various applications or programs may be stored in the non-transitory readable medium such as a compact disc (CD), a digital versatile disc (DVD), a hard disc, a Blu-ray disc, a universal serial bus (USB), a memory card, a read only memory (ROM), and the like.

While the present disclosure has been illustrated and described with reference to various example embodiments thereof, it will be understood by those skilled in the art that various changes in form and details may be made therein without departing from the true spirit and full scope of the disclosure.

What is claimed is:

1. An electronic apparatus comprising:
a storage configured to store a language model, the language model comprising an embedding matrix and a softmax matrix and being trained with a recurrent neural network (RNN) as primary data comprising a plurality of sentences;
a communicator comprising communication circuitry; and
a processor configured to control the electronic apparatus to:
obtain a recommended message, comprising an inputted text using the stored language model based on the text being input, and
control the communicator to transmit the recommended message to an external electronic apparatus based on receiving an input for transmitting the recommended message,
wherein the processor is configured to obtain a plurality of first data mapping a plurality of first vectors respectively corresponding to one or more words and a punctuation mark included in a first sentence of the plurality of sentences to a vector space based on a first random matrix,
generate second data based on the first data,
obtain a restoration vector restored from the second data based on a second random matrix,
update an element of the first random matrix and the second random matrix based on an error between a second vector corresponding to a primary word included in a second sentence following the first sentence and the restoration vector, and
store the updated first random matrix and the updated second random matrix to the storage as the embedding matrix and the softmax matrix, respectively, and
wherein the processor is configured to obtain the recommended message by applying the inputted text and one or more messages transmitted and received between the communicator and the external electronic apparatus prior to the text being input to the language model.

2. The electronic apparatus of claim 1, wherein the processor is configured to control the electronic apparatus to:
obtain contextual information on the one or more prior messages, and
obtain the recommended message including a word corresponding to the inputted text as a primary word and following the one or more prior messages, using the obtained contextual information.

3. The electronic apparatus of claim 1, wherein the processor is configured to control the electronic apparatus to:
obtain the recommended message based on a first word corresponding to the inputted text, a second word corresponding to the inputted text, and the one or more prior messages, and
wherein the obtained recommended message includes a primary word and a secondary word.

4. The electronic apparatus of claim 1, wherein the processor is configured to control the electronic apparatus to:
obtain a plurality of third data mapping the plurality of first vectors and the second vector respectively to the vector space based on the first random matrix,
generate fourth data based on the plurality of third data,
obtain another restoration vector restored from the fourth data based on the second random matrix,
update an element of the first random matrix and update an element of the second random matrix based on an error between the third vector corresponding to a secondary word of the second sentence and the another restoration vector, and
store, to the storage, the updated first random matrix and the second random matrix as the embedding matrix and the softmax matrix, respectively.

5. The electronic apparatus of claim 1, wherein the processor is configured to control the electronic apparatus to:
update an element of the first random matrix and an element of the second random matrix based on all of the plurality of sentences, and
store, to the storage, the first random matrix and the second random matrix in which an element is updated based on remaining sentences as the embedding matrix and the softmax matrix, respectively.

6. A method of controlling an electronic apparatus, the method comprising:

training a language model, the language model comprising an embedding matrix and a softmax matrix and being trained with a recurrent neural network (RNN) using primary data including a plurality of sentences;
obtaining a recommended message, comprising an inputted text using the trained language model based on the text being input; and
transmitting the recommended message to an external electronic apparatus based on receiving an input for transmitting the recommended message,
wherein RNN training the language model comprises:
obtaining a plurality of first data mapping a plurality of first vectors respectively corresponding to one or more words and a punctuation mark included in a first sentence of the plurality of sentences to a vector space based on a first random matrix,
generating second data based on the first data,
obtaining a restoration vector restored from the second data based on a second random matrix,
updating an element of the first random matrix and the second random matrix based on an error between a second vector corresponding to a primary word included in a second sentence following the first sentence and the restoration vector, and
storing to a storage, the updated first random matrix and the updated second random matrix as the embedding matrix and the softmax matrix, respectively, and
wherein the obtaining the recommended message comprises obtaining the recommended message by applying the inputted text and one or more messages transmitted and received between the electronic apparatus and the external electronic apparatus prior to the text being input to the language model.

7. The method of claim 6, wherein obtaining the recommended message comprises:
obtaining contextual information on the one or more prior messages; and
obtaining the recommended message that comprises a word corresponding to the inputted text as a primary word and follows the one or more prior messages, using the obtained contextual information.

8. The method of claim 6, further comprising:
obtaining the recommended message based on a first word corresponding to the inputted text, a second word corresponding to the inputted text, and one or more prior messages, and
wherein the recommended message comprises a primary word and a secondary word.

9. The method of claim 6, wherein RNN training the language model comprises:
obtaining a plurality of third data mapping the plurality of first vectors and the second vector respectively to the vector space based on the first random matrix,
generating fourth data based on the plurality of third data,
obtaining another restoration vector restored from the fourth data based on the second random matrix,
updating an element of the first random matrix and updating an element of the second random matrix based on an error between the third vector corresponding to a secondary word of the second sentence and the another restoration vector, and
storing, to the storage, the updated first random matrix and the second random matrix as the embedding matrix and the softmax matrix, respectively.

10. The method of claim 6, wherein RNN training the language model comprises:

updating an element of the first random matrix and the second random matrix respectively based on all of the plurality of sentences, and storing, to the storage, the first random matrix and the second random matrix in which an element is updated based on the remaining sentences as the embedding matrix and the softmax matrix, respectively.

11. A non-transitory computer-readable medium having instructions stored thereon which, when executed by a processor of an electronic apparatus, cause the electronic apparatus to perform operations comprising:

training a language model, the language model comprising an embedding matrix and a softmax matrix and being trained with a recurrent neural network (RNN) using primary data including a plurality of sentences;

obtaining a recommended message, comprising an inputted text based on the text being input; and transmitting the recommended message to an external electronic apparatus based on receiving an input for transmitting the recommended message, wherein RNN training the language model comprises:

obtaining a plurality of first data mapping a plurality of first vectors respectively corresponding to one or more words and a punctuation mark included in a first sentence of the plurality of sentences to a vector space based on a first random matrix, generating second data based on the first data, obtaining a restoration vector restored from the second data based on a second random matrix, updating an element of the first random matrix and the second random matrix based on an error between a second vector corresponding to a primary word included in a second sentence following the first sentence and the restoration vector, and storing to a storage, the updated first random matrix and the updated second random matrix as the embedding matrix and the softmax matrix, respectively, and wherein the obtaining the recommended message comprises obtaining the recommended message by applying the inputted text and one or more messages transmitted and received between the electronic apparatus and the external electronic apparatus prior to the text being input, to the language model.

12. The electronic apparatus of claim 1, wherein the processor is configured to:

determine a first predicted word following the word corresponding to the inputted text by applying a sentence corresponding to the one or more prior messages and a word corresponding to the inputted text to the language model, determine a second predicted word following the determined first predicted word by applying the sentence corresponding to the one or more prior messages, the word corresponding to the inputted text, and the determined first predicted word to the language model, and obtain the recommended message sequentially comprising the word corresponding to the inputted text, the first predicted word and the second predicted word.

13. The controlling method of claim 6, wherein obtaining the recommended message comprises:

determining a first predicted word following the word corresponding to the inputted text by applying a sentence corresponding to the one or more prior messages and a word corresponding to the text input to the language model, determining a second predicted word following the determined first predicted word by applying the sentence corresponding to the one or more prior messages, the word corresponding to the inputted text, and the determined first predicted word to the language model, and obtaining the recommended message sequentially comprising the word corresponding to the inputted text, the first predicted word, and the second predicted word.

* * * * *